WILLIAM F. JONES.
Improvement in Churn-Dashers.
No. 115,323.  Patented May 30, 1871.
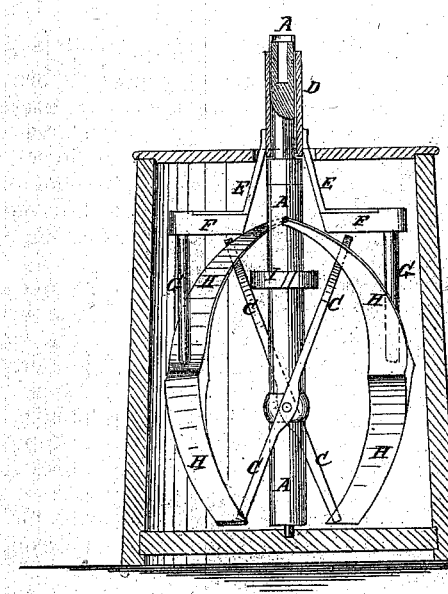
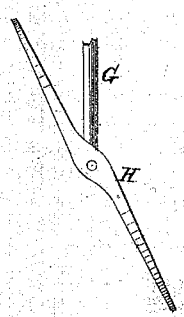 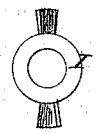 

UNITED STATES PATENT OFFICE.

WILLIAM F. JONES, OF EASTON, KANSAS.

IMPROVEMENT IN CHURN-DASHERS.

Specification forming part of Letters Patent No. 115,323, dated May 30, 1871.

*To all whom it may concern:*

Be it known that I, WILLIAM F. JONES, of Easton, in the county of Leavenworth and State of Kansas, have invented a new and useful Improvement in Double Churn-Dashers; and I do hereby declare that the following is a full, clear, and exact description thereof, which will enable others skilled in the art to make and use the same, reference being had to the accompanying drawing forming part of this specification, in which—

Figure 1 is a side view of my improved dasher as arranged in a churn, the churn being shown in section. Fig. 2 is an edge view of one of the outer paddles or breakers. Fig. 3 is a side view of one of the inner paddles or breakers. Fig. 4 is a top view of the gatherer.

Similar letters of reference indicate corresponding parts.

My invention has for its object to furnish an improved double dasher, which shall be so constructed as to break up the cream and throw it into violent agitation, bringing the butter in a very short time; and it consists in the double dasher constructed and operating as hereinafter more fully described.

A is the dasher-shaft, the lower end of which is pivoted to the center of the churn-bottom. To the shaft A, at a distance from its lower end equal to about one-third the height of the churn, is attached a round or cross bar, B, to the ends of which are attached the inner paddles or breakers C. The paddles or breakers C are made as shown in Figs. 1 and 3, and are set in an inclined position, as shown in Fig. 1. The upper end of the shaft A has a long round tenon formed upon it to receive the short hollow shaft D, the lower end of which rests upon the shoulder of the shaft A. To the lower part of the hollow shaft D are attached the upper ends of two bars, E, which extend downward and incline outward, and to the lower ends of which are attached the inner ends of the short horizontal bars F, said bars F being at such a height that the upper ends of the paddles or breakers C will pass beneath them. To the outer ends of the bars F are attached the upper end of the bars G, which extend downward nearly to the level of the round B, and to their lower ends are attached the outer paddles or breakers H. The paddles or breakers H are made in about the shape shown in Figs. 1 and 2, having an offset formed in them so that the lower ends of the bars G may pass through them more squarely. The paddles H are set at an angle, and are inclined in the opposite direction from the paddles or breakers C.

The dasher may be operated by hand-power or by other power, the gearing by which the power is applied being so arranged as to revolve the shafts A D, and with them the paddles or breakers C H, in opposite directions. The paddles or breakers C H should be always revolved with their upper and pointed ends forward until the churning is almost done and the butter about ready to gather. Then turn the dasher backward a short time, which causes the butter to slip from the paddles upon the top of the milk. Then turn the dasher about half a revolution backward and forward, alternately, until the butter begins to gather or bunch. Then turn the dasher backward slowly for a short time, which will gather the butter. A few rapid turns of the dasher backward and forward should then be given, which will rinse down the churn and dasher without water. Then give the dasher a few turns backward slowly, which will gather the butter in two bunches. The cover of the churn may then be removed and the dasher lifted out, the paddles slipping out of the butter without disturbing it. The operation of gathering the butter may be assisted by the gatherer I, which is a disk or wheel placed loosely upon the shaft A, and which is provided with two lugs upon its opposite sides, which rest against its inner paddles or breakers C, so that the gatherer may be carried around with the inner part of the dasher in its revolution. The gatherer I floats upon the top of the milk, and in case the quantity of milk is so small as not to reach to the round B, the said gatherer should be slipped upon the shaft A below the said round B. In case the milk rises above the round B, the gatherer should be placed upon the shaft A, above the round B, as shown in Fig. 1.

Having thus described my invention, I claim as new and desire to secure by Letters Patent—

The combination of the shaft A, round or cross bar B, inner paddles or breakers C, short hollow shaft D, bars or arms E F G, and outer paddles or breakers H, said parts being constructed and operating in connection with each other substantially as herein shown and described, and for the purposes set forth.

WILLIAM F. JONES.

Witnesses:
ALFRED B. JONES,
R. A. KELSEY.